(12) United States Patent
Song

(10) Patent No.: US 10,330,980 B2
(45) Date of Patent: *Jun. 25, 2019

(54) QUANTUM DOT LIGHT EMITTING DEVICE, BACKLIGHT MODULE, AND DISPLAY DEVICE

(71) Applicants: Hisense Electric Co., Ltd., Shandong (CN); HISENSE USA CORPORATION, Suwanee, GA (US); HISENSE INTERNATIONAL CO., LTD., Shandong (CN)

(72) Inventor: Zhicheng Song, Shandong (CN)

(73) Assignees: Hisense Electric Co., Ltd., Shandong (CN); Hisense USA Coporation, Suwanee, GA (US); Hisense International Co., Ltd., Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,696

(22) Filed: Oct. 10, 2017

(65) Prior Publication Data

US 2018/0031920 A1 Feb. 1, 2018

Related U.S. Application Data

(63) Continuation of application No. 15/223,495, filed on Jul. 29, 2016, now Pat. No. 9,835,902.

(30) Foreign Application Priority Data

Dec. 4, 2015 (CN) .......................... 2015 1 0889602

(51) Int. Cl.
G02F 1/1335 (2006.01)

(52) U.S. Cl.
CPC .................. *G02F 1/133603* (2013.01); *G02F 2001/133614* (2013.01); *G02F 2202/36* (2013.01)

(58) Field of Classification Search
CPC ................................................. G02F 1/133603
See application file for complete search history.

(56) References Cited

FOREIGN PATENT DOCUMENTS

CN 203965764 U 11/2014
CN 104460102 A 3/2015
(Continued)

*Primary Examiner* — Thomas M Sember
(74) *Attorney, Agent, or Firm* — Hoffmann & Baron, LLP

(57) ABSTRACT

The disclosure provides a quantum dot light emitting device, a backlight module, and a display device. The quantum dot light emitting device arranged on a first substrate which is a printed circuit board of a display device includes at least one backlight light source and a quantum dot optical element, wherein the at least one backlight light source is arranged on the first substrate, and configured to emit light; and the quantum dot optical element is fixed by a bracket on the first substrate above the at least one backlight light source, and configured to transmit the light emitted by the at least one backlight light source; wherein the quantum dot optical element includes two second substrates arranged opposite to each other, at least two blocking layers arranged opposite to each other, and a plurality of quantum dots, wherein the at least two blocking layers are arranged respectively at edges of the two second substrates so that an airtight space is defined by the two second substrates and the at least two blocking layers; and the quantum dots are filled in the airtight space. There will be a smaller number of quantum dots in this disclosure, and thus there will be a lower cost.

20 Claims, 3 Drawing Sheets

(56) References Cited

FOREIGN PATENT DOCUMENTS

| | | |
|---|---|---|
| CN | 104654141 A | 5/2015 |
| CN | 104736662 A | 6/2015 |
| CN | 104914622 A | 9/2015 |
| CN | 104932142 A | 9/2015 |
| CN | 105098039 A | 11/2015 |

QUANTUM DOT LIGHT EMITTING DEVICE, BACKLIGHT MODULE, AND DISPLAY DEVICE

CROSS-REFERENCE TO RELATED APPLICATION

This application is a continuation of U.S. patent application Ser. No. 15/223,495, filed on Jul. 29, 2016, which claims the benefit of Chinese Patent Application No. 201510889602.1, filed on Dec. 4, 2015, both of which are hereby incorporated by reference in their entireties.

FIELD

This disclosure relates to the field of display technologies, and particularly to a quantum dot light emitting device, a backlight module, and a display device.

BACKGROUND

Since the wavelength of light emitted by quantum dots being excited is related to their energy level structures, the half-wave width of the emitted light can be so narrow, and the purity of the emitted light can be so high that a display device made of quantum dot light-emitting materials can have a wide color gamut, so quantum dot products have been widely applied.

SUMMARY

Some embodiments of this disclosure provide a quantum dot light emitting device arranged on a first substrate which is a printed circuit board of a display device, the quantum dot light emitting device includes at least one backlight light source and a quantum dot optical element, wherein:

the at least one backlight light source is arranged on the first substrate, and configured to emit light; and the quantum dot optical element is fixed by a bracket on the first substrate above the at least one backlight light source, and configured to transmit the light emitted by the at least one backlight light source;

wherein the quantum dot optical element includes two second substrates arranged opposite to each other, at least two blocking layers arranged opposite to each other, and a plurality of quantum dots, wherein the at least two blocking layers are arranged respectively at edges of the two second substrates so that an airtight space is defined by the two second substrates and the at least two blocking layers; and the quantum dots are filled in the airtight space.

Some embodiments of this discourse provide a direct-type backlight module, the backlight module includes: a rear panel, a plurality of quantum dot light emitting devices, and an optical membrane located above the quantum dot light emitting devices, wherein:

each of the quantum dot light emitting devices includes at least one backlight light source and a quantum dot optical element, wherein:

the at least one backlight light source is arranged on the rear panel, and configured to emit light; and the quantum dot optical element is fixed by a bracket on the rear panel above the at least one backlight light source, and configured to transmit the light emitted by the at least one backlight light source;

wherein the quantum dot optical element includes two substrates arranged opposite to each other, at least two blocking layers arranged opposite to each other, and a plurality of quantum dots, wherein the at least two blocking layers are arranged respectively at edges of the two substrates so that an airtight space is defined by the two substrates and the at least two blocking layers; and the quantum dots are filled in the airtight space;

wherein the quantum dot light emitting devices are fixed on the rear panel.

Some embodiments of this discourse provide a display device including: a direct-type backlight module, and a display panel, wherein:

the direct-type backlight module includes a rear panel, a plurality of quantum dot light emitting devices, and an optical membrane located above the quantum dot light emitting devices, wherein:

each of the quantum dot light emitting devices includes at least one backlight light source and a quantum dot optical element, wherein:

the at least one backlight light source is arranged on the rear panel, and configured to emit light; and the quantum dot optical element is fixed by a bracket on the rear panel above the at least one backlight light source, and configured to transmit the light emitted by the at least one backlight light source;

wherein the quantum dot optical element includes two substrates arranged opposite to each other, at least two blocking layers arranged opposite to each other, and a plurality of quantum dots, wherein the at least two blocking layers are arranged respectively at edges of the two substrates so that an airtight space is defined by the two substrates and the at least two blocking layers; and the quantum dots are filled in the airtight space;

wherein the quantum dot light emitting devices are fixed on the rear panel; and wherein the display panel is arranged above the backlight module.

BRIEF DESCRIPTION OF THE DRAWINGS

In order to make the technical solutions according to some embodiments of this disclosure more apparent, the drawings to which a description of some embodiments will be briefly introduced below, and apparently the drawings to be described below are merely illustrative of some of the embodiments of this disclosure, and those ordinarily skilled in the art can derive from these drawings other drawings without any inventive effort. In the drawings.

DETAILED DESCRIPTION OF THE EMBODIMENTS

In order to make the objects, technical solutions, and advantages of some embodiments of this disclosure more apparent, the technical solutions according to some embodiments of this disclosure will be described below with reference to the drawings in some embodiments of this disclosure, and apparently the embodiments described below are only a part but not all of the embodiments of this disclosure. Based upon the embodiments here of this disclosure, all the other embodiments which can occur to those skilled in the art without any inventive effort shall fall into the scope of this disclosure.

A quantum dot light emitting device according to some embodiments of the disclosure can be applicable to a backlight module, e.g., a direct-type backlight module.

Figure 1:
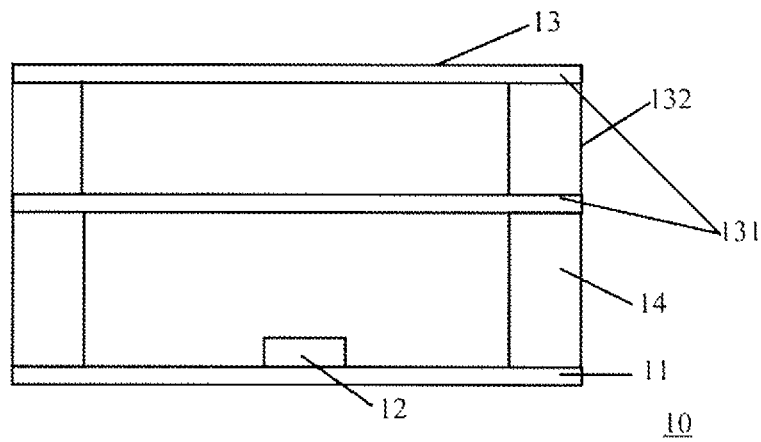
FIG. 1 is a schematic structural diagram of a quantum dot light emitting device according to some embodiments of the disclosure.

FIG. 1 is a schematic structural diagram of a quantum dot light emitting device according to some embodiments of the disclosure. As illustrated in FIG. 1, a quantum dot light emitting device 10 according to some embodiments of the disclosure includes:

At least one backlight light source 12, and a quantum dot optical element 13;

Where the backlight light source 12 is arranged on a first substrate 11, and configured to emit light; and The quantum dot optical element 13 is fixed by a bracket 14 on the first substrate 11 above the backlight light source 12, and configured to transmit the light emitted by the backlight light source 12;

Where the quantum dot optical element 13 includes two second substrates 131 arranged opposite to each other, two blocking layers 132 arranged opposite to each other, and a plurality of quantum dots. The blocking layers 132 are arranged respectively at edges between the second substrates 131 so that an airtight space is defined by the two second substrates 131 and the blocking layers 132; and the quantum dots are filled in the airtight space.

Figure 2:
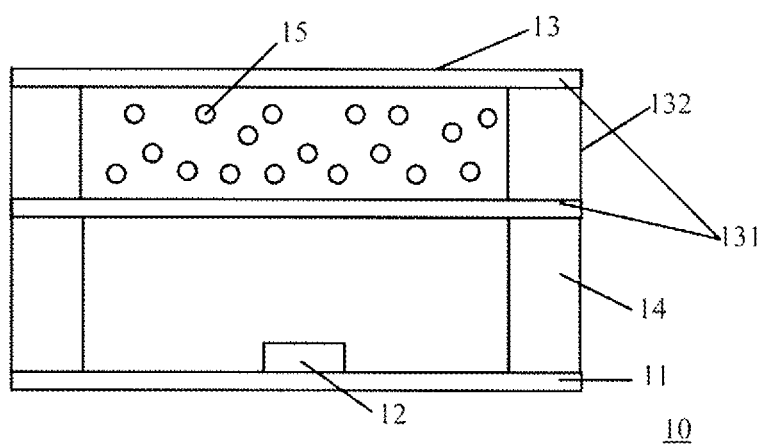
FIG. 2 is a schematic structural diagram of a quantum dot light emitting device according to some embodiments of the disclosure.

In a direct-type backlight module in which a backlight light source is provided using a quantum membrane, as illustrated in FIG. 2, the backlight light source 12 is arranged on the first substrate 11, and the quantum dot optical element 13 is fixed above the backlight light source 12 through the bracket 14, where the quantum dot optical element 13 includes the two second substrates 131 arranged opposite to each, and the two blocking layers 132 arranged between the edges of the second substrates 131, where the airtight space is defined by the two second substrates 131 and the blocking layers 132; and the quantum dots are filled in the airtight space, so that there is a quantum dot optical element arranged above each backlight light source. Since the backlight light sources are arrayed on the first substrate at a specific interval, the number of quantum dots in the backlight module including the quantum dot light emitting devices according to the embodiment of this disclosure will be smaller than the number of quantum dots, and thus the cost of the backlight module will be lower than the cost in the prior art.

In some embodiments, the two second substrates have the same size and/or the second substrates are parallel to the first substrate.

Since the quantum dots tend to be invalidated upon exposure to oxygen, the blocking layers 132 are further arranged on the edges between the two second substrate 131 so that the airtight space is defined by the two second substrate 131 and the blocking layers 132 to thereby avoid the quantum dots filled in the airtight space from being oxidized.

Particularly in a real application, the blocking layers 132 can be hydro-oxygen blocking colloids.

Since the quantum dot optical element 13 is located above the backlight light source 12, and configured to transmit the light by the backlight light source 12, the second substrates 131 in the quantum dot optical element 13 can be substrates made of glass.

The first substrate 11 is a Printed Circuit Board (PCB).

In the quantum dot light emitting device according to some embodiments of the disclosure, there is a quantum dot optical element 13 arranged above each backlight light source and configured to transmit the light by the backlight light source, where the quantum dot optical element is an optical element in which quantum dots are filled; and since the backlight light sources are arrayed on the first substrate at a specific interval, the number of quantum dots in use will be smaller, and thus the cost thereof will be lower than the prior art in which the entire quantum membrane is arranged above all the backlight light sources.

In some embodiments, the quantum dots are filled in the airtight space in the form of quantum dot colloids.

The quantum dot colloids can be combined in a plurality of schemes, where in a first scheme, mixed red and green quantum dot colloids need to cooperate with blue LED lamps to generate white light; in a second scheme, separate red quantum dot colloids need to be cooperate with blue LED lamps and green fluorescent powder, or separate green quantum dot colloids need to be cooperate with blue LED lamps and red fluorescent powder; and in a third scheme, red quantum dots and green fluorescent powder, or green quantum dots and red fluorescent powder need to cooperate with blue LED lamps.

It shall be noted that the quantum dot colloids can alternatively be combined in other schemes than the combination schemes, and this disclosure will not be limited to any particular combination scheme.

FIG. 2 is a schematic structural diagram of a quantum dot light emitting device according to some embodiments of this disclosure. The quantum dot optical element is arranged above the backlight light source, and the quantum dot colloids in the quantum dot optical element tend to expand upon being heated and contract upon being cooled, so if the quantum dot colloids expand upon being heated, then the quantum dot optical element may tend to be expanded and broken, and if the quantum dot colloids contract upon being cooled, then the quantum dot optical element may tend to be wrinkled and broken, so that light may be leaked.

In view of this, in this embodiment, the quantum dot colloids are further filled with inert gas bubbles 15 as illustrated in FIG. 2.

The quantum dot colloids are filled with the inert gas bubbles 15, so that if the quantum dot colloids expand upon being heated, then the inert gas bubbles 15 will be extruded to thereby maintain the volume of the quantum dot colloids, so that the quantum dot optical element will not be expanded and broken; and if the quantum dot colloids contract upon being cooled, then the quantum dot colloids will not be wrinkled and broken due to the inert gas bubbles 15 filled therein, so that there will be no light leaked throughout the backlight module. It shall be noted that the number of inert gas bubbles can match the volume of the airtight space, for example, the number of inert gas bubbles in a unit of volume will not be less than a predefined value.

In an embodiment of this disclosure, the quantum dots will not be invalidated upon exposure to oxygen due to the inert gas.

The inert gas bubbles are filled in the quantum dot colloids so that if the inert gas bubbles in the quantum dot optical element expand upon being heated and contract upon being cooled, then the quantum dot optical element will be neither expanded and broken, nor wrinkled and broken, thus avoiding light from being leaked.

Figure 3:
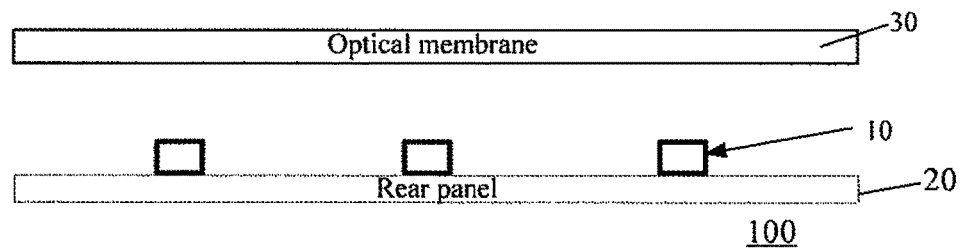
FIG. 3 is another schematic structural diagram of a direct-type backlight module according to some embodiments of the disclosure.

FIG. 3 is a schematic structural diagram of a direct-type backlight module according to some embodiments of this disclosure. As illustrated in FIG. 3, the direct-type backlight module 100 includes:

A rear panel 20, a plurality of quantum dot light emitting devices 10 as described in the embodiments above, and an optical membrane 30 located above the quantum dot light emitting devices 10;

Where the quantum dot light emitting devices 10 are fixed on the rear panel 20 with their second substrates parallel to the rear panel 20.

Figure 4:
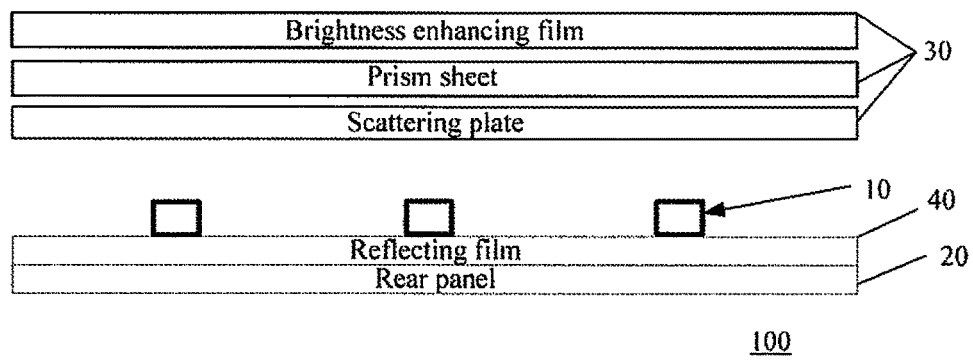
FIG. 4 is another schematic structural diagram of a direct-type backlight module according to some embodiments of the disclosure.

FIG. 4 is a schematic structural diagram of a direct-type backlight module according to some embodiments of this disclosure. In a real application, as illustrated in FIG. 4, a reflecting film 40 is further arranged on the rear panel 20, where the quantum dot light emitting devices 10 are fixed on the reflecting film 40 on the rear panel 20.

Further to the embodiment illustrated in FIG. 1, as illustrated in FIG. 4, the optical membrane 30 includes:

A scattering plate, a prism sheet located above the scattering plate, and a brightness enhancing film located above the prism sheet.

Particularly the light emitted by the quantum dot light emitting devices 10 is substantially scattered by the scattering plate for the purpose of a softer and more uniform illumination effect.

The brightness enhancing film is configured to enhance the efficiency of light emission, and the prism sheet is also configured to enhance the brightness, where the prism sheet can include a Horizontal Brightness Enhancement Film (HBEF) and a Vertical Brightness Enhancement Film (VBEF) from the bottom up.

It shall be noted that the embodiment of the direct-type backlight module substantially corresponds to the embodiment of the quantum dot light emitting device, so reference can be made to the description of the embodiment of the quantum dot light emitting device for details of the direct-type backlight module.

Figure 5:
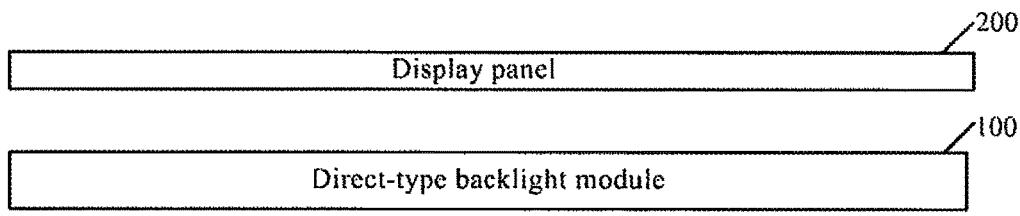
FIG. 5 is a schematic structural diagram of a display device according to some embodiments of the disclosure.

FIG. 5 is a schematic structural diagram of a display device according to some embodiments of this disclosure. As illustrated in FIG. 5, the display device according to this embodiment includes:

The direct-type backlight module 100 according to the embodiment above, and a display panel 200;

Where the display panel 20 is arranged above the direct-type backlight module 10.

In a real application, the display panel can be a thin film transistor Liquid Crystal Display (LCD).

Figure 6:
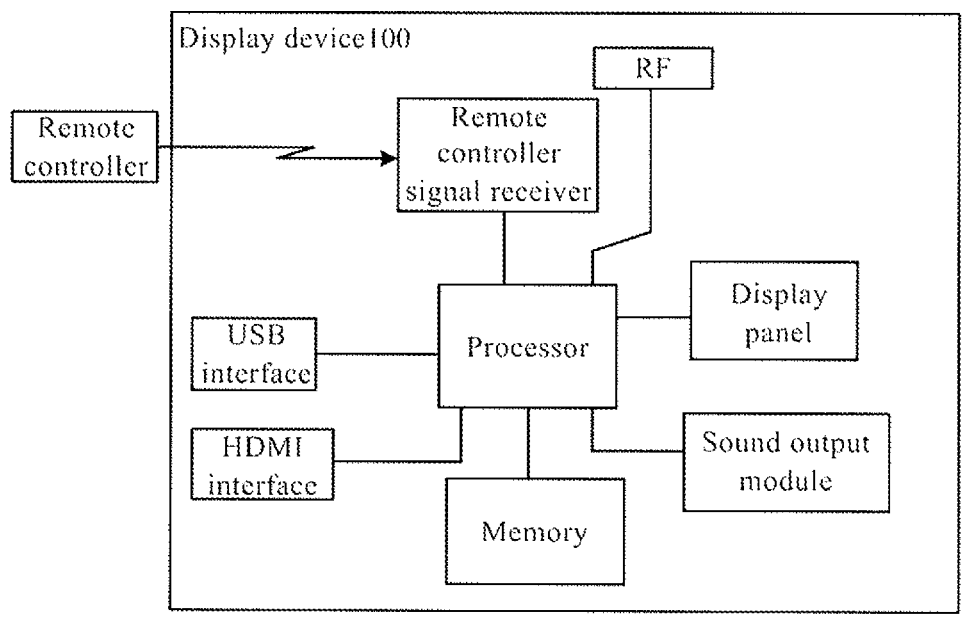
FIG. 6 is another schematic structural diagram of a display device according to some embodiments of the disclosure.

FIG. 6 is a schematic structural diagram of a display device according to some embodiments of this disclosure. As illustrated in FIG. 6, the display device 100 can include a memory, an input unit, an output unit, one or more processors, and other components. Those skilled in the art can appreciate that the display device will not be limited to the structure of the display device illustrated in FIG. 6, but can include more or less components than those as illustrated or some of the components can be combined or different components can be arranged, where:

The memory can be configured to store software programs and modules, and the processor can be configured to run the software programs and modules stored in the memory to thereby perform various function applications and data processing. The memory can include a high-speed random access memory and can further include a nonvolatile memory, e.g., at least one magnetic disk memory device, a flash memory device or another volatile solid memory device. Moreover the memory can further include a memory controller configured to provide an access of the processor and the input unit to the memory.

The processor is a control center of the display device 100, has the respective components of the entire terminal connected by various interfaces and lines, and runs or executes the software programs and/or the modules stored in the memory and invokes the data stored in the memory to perform the various functions of the display device 100 and process the data to thereby manage and control the display device as a whole. Optionally the processor can include one or more processing cores; and optionally the processor can be integrated with an application processor and a modem processor, where the application processor generally handles the operating system, the user interfaces, the applications, etc., and the modem processor generally handles wireless communication. As can be appreciated, the modem processor may not be integrated into the processor.

The display device 100 can include a TV and radio receiver, a High-Definition Multimedia Interface (HDMI), a USB interface, an audio and video input interface, and other input units, and the input units can further include a remote control receiver to receive a signal sent by a remote controller. Moreover the input units can further include a touch sensitive surface and other input devices, where the touch sensitive surface can be embodied in various types of resistive, capacitive, infrared, surface sound wave and other types, and the other input device can include but will not be limited to one or more of a physical keyboard, functional keys (e.g., a volume control button, a ON/OFF button, etc.), a track ball, a mouse, a joystick, etc.

The output unit is configured to output an audio signal, a video signal, an alert signal, a vibration signal, etc. The output unit can include a display panel, a sound output module, etc. The display panel can be configured to display information input by a user or information provided to the user and various graphic user interfaces of the display device 100, where these graphic user interfaces can be composed of graphics, texts, icons, videos and any combination thereof. For example, the display panel can be embodied as a Liquid Crystal Display (LCD), an Organic Light-Emitting Diode (OLED), a flexible display, a 3D display, a CRT, a plasmas display panel, etc.

The display device 100 can further include at least one sensor (not illustrated), e.g., an optical sensor, a motion sensor and other sensors. Particularly the optical sensor can include an ambient optical sensor and a proximity sensor, where the ambient optical sensor can adjust the brightness of the display panel according to the luminosity of ambient light, and the proximity sensor can power off the display panel and/or a backlight when the display device 100 moves to some position. The display device 100 can be further configured with a gyroscope, a barometer, a hygrometer, a thermometer, an infrared sensor, and other sensors.

The display device 100 can further include an audio circuit (not illustrated), and a speaker and a transducer can provide an audio interface between the user and the display device 100. The audio circuit can convert received audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted to another display device, for example, or the audio data is output to the memory or further processing. The audio circuit may further include an earphone jack for communication between a peripheral earphone and the display device 100.

Moreover the display device 100 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. Moreover the display device 100 can further include a camera, a Bluetooth module, etc.

Moreover the display device 100 further includes a Wireless Fidelity (WiFi) module (not illustrated). The WiFi is a technology of short-range wireless transmission, and the display device 100 can assist the user in transmitting and receiving an email, browsing a web page, accessing streaming media, etc., and also provide the user with a wireless broadband access to the Internet, through the WiFi module. However it can be appreciated that the WiFi module may not necessarily be included in the display device 100 but can be omitted as required without departing from the scope of the spirit of this disclosure.

It shall be noted that the embodiment of the display device substantially corresponds to the embodiment of the direct-type backlight module, so reference can be made to the description of the embodiment of the direct-type backlight module for details of the display device.

Lastly it shall be noted that the respective embodiments above are merely intended to illustrate but not to limit the technical solution of this disclosure; and although this disclosure has been described above in details with reference to the embodiments above, those ordinarily skilled in the art shall appreciate that they can modify the technical solution recited in the respective embodiments above or make equivalent substitutions to a part of the technical features thereof; and these modifications or substitutions to the corresponding technical solution shall also fall into the scope of this disclosure as claimed.

The invention claimed is:

1. A quantum dot light emitting device, arranged on a first substrate which is a printed circuit board of a display device, the quantum dot light emitting device comprises at least one backlight light source and a quantum dot optical element, wherein:
   the at least one backlight light source is arranged on the first substrate, and configured to emit light; and
   the quantum dot optical element is fixed by a bracket on the first substrate, and arranged above the at least one backlight light source, and configured to transmit the light emitted by the at least one backlight light source;
   wherein the quantum dot optical element comprises two second substrates arranged opposite to each other, a blocking layer, and a plurality of quantum dots, wherein the blocking layer is arranged between edges of the two second substrates such that an airtight space is defined by the two second substrates and the blocking layer; and the quantum dots are filled in the airtight space.

2. The quantum dot light emitting device according to claim 1, wherein the quantum dots are filled in the airtight space in the form of quantum dot colloids.

3. The quantum dot light emitting device according to claim 2, wherein the quantum dot colloids are filled with inert gas bubbles, the number of which matches volume of the airtight space.

4. The quantum dot light emitting device according to claim 1, wherein each of the two second substrates is shaped in a triangle, and a quantity of the blocking layer is three.

5. The quantum dot light emitting device according to claim 1, wherein the at least one backlight light source is arrayed in M rows and N columns, wherein M is a positive integer, and N is a positive integer; and there are P backlight light sources in the M rows, and Q backlight light sources in the N columns, wherein P is a positive integer, and Q is a positive integer.

6. The quantum dot light emitting device according to claim 5, wherein the P backlight light sources are spaced at a uniform interval, and the Q backlight light sources are spaced at a uniform interval.

7. A direct-type backlight module, comprising a rear panel, a plurality of quantum dot light emitting devices, and an optical membrane located above the quantum dot light emitting devices, wherein:
   each of the quantum dot light emitting devices comprises at least one backlight light source and a quantum dot optical element, wherein:
   the at least one backlight light source is arranged on the rear panel, and configured to emit light; and
   the quantum dot optical element is fixed by a bracket on the rear panel, and arranged above the at least one backlight light source, and configured to transmit the light emitted by the at least one backlight light source;
   wherein the quantum dot optical element comprises two substrates arranged opposite to each other, a blocking layer, and a plurality of quantum dots, wherein the blocking layer is arranged between edges of the two substrates such that an airtight space is defined by the two substrates and the blocking layer; and the quantum dots are filled in the airtight space; and
   wherein the quantum dot light emitting devices are fixed on the rear panel.

8. The direct-type backlight module according to claim 7, wherein a reflecting film is arranged on the rear panel, and the quantum dot light emitting devices are fixed on the reflecting film on the rear panel.

9. The direct-type backlight module according to claim 7, wherein the quantum dots are filled in the airtight space in the form of quantum dot colloids.

10. The direct-type backlight module according to claim 9, wherein the quantum dot colloids are filled with inert gas bubbles, the number of which matches the volume of the airtight space.

11. The direct-type backlight module according to claim 7, wherein each of the two substrates is shaped in a triangle, and a quantity of the blocking layers is three.

12. The direct-type backlight module according to claim 7, wherein the at least one backlight light source is arrayed in M rows and N columns, wherein M is a positive integer, and N is a positive integer; and there are P backlight light sources in the M rows, and Q backlight light sources in the N columns, wherein P is a positive integer, and Q is a positive integer.

13. The direct-type backlight module according to claim 12, wherein the P backlight light sources are spaced at a uniform interval, and the Q backlight light sources are spaced at a uniform interval.

14. A display device, comprising a direct-type backlight module, and a display panel, wherein:
   the direct-type backlight module comprises a rear panel, a plurality of quantum dot light emitting devices, and an optical membrane located above the quantum dot light emitting devices, wherein:

each of the quantum dot light emitting devices comprises at least one backlight light source and a quantum dot optical element, wherein:

the at least one backlight light source is arranged on the rear panel, and configured to emit light; and the quantum dot optical element is fixed by a bracket on the rear panel, and arranged above the at least one backlight light source, and configured to transmit the light emitted by the at least one backlight light source;

wherein the quantum dot optical element comprises two substrates arranged opposite to each other, a blocking layer, and a plurality of quantum dots, wherein the blocking layer is arranged between edges of the two substrates such that an airtight space is defined by the two substrates and the blocking layer; and the quantum dots are filled in the airtight space;

wherein the quantum dot light emitting devices are fixed on the rear panel; and wherein the display panel is arranged above the backlight module.

15. The display device according to claim 14, wherein a reflecting film is arranged on the rear panel, and the quantum dot light emitting devices are fixed on the reflecting film on the rear panel.

16. The display device according to claim 14, wherein the quantum dots are filled in the airtight space in the form of quantum dot colloids.

17. The display device according to claim 16, wherein the quantum dot colloids are filled with inert gas bubbles, the number of which matches the volume of the airtight space.

18. The display device according to claim 14, wherein each of the two substrates is shaped in a triangle, and a quantity of the blocking layer is three.

19. The display device according to claim 14, wherein the at least one backlight light source is arrayed in M rows and N columns, wherein M is a positive integer, and N is a positive integer; and there are P backlight light sources in the M rows, and Q backlight light sources in the N columns, wherein P is a positive integer, and Q is a positive integer.

20. The display device according to claim 19, wherein the P backlight light sources are spaced at a uniform interval, and the Q backlight light sources are spaced at a uniform interval.

* * * * *